United States Patent [19]
Takacs et al.

[11] 4,096,613
[45] Jun. 27, 1978

[54] CUTTING TOOL

[75] Inventors: Victor C. Takacs; Joseph E. Takacs, both of Houston, Tex.

[73] Assignee: Triangle Grinding, Inc., Houston, Tex.

[21] Appl. No.: 781,207

[22] Filed: Mar. 25, 1977

[51] Int. Cl.² ............................................. B26D 1/00
[52] U.S. Cl. ......................................... 407/92; 408/185
[58] Field of Search .................. 29/96; 408/153, 181, 408/185, 713, 238, 239, 240

[56] References Cited

U.S. PATENT DOCUMENTS

| | | | |
|---|---|---|---|
| 2,378,094 | 6/1945 | Nunes-Vaz | 29/96 |
| 2,400,856 | 5/1946 | Thompson | 29/96 X |
| 2,451,246 | 10/1948 | Sheridan | 29/96 |
| 3,172,190 | 3/1965 | Beach | 29/96 |
| 3,289,273 | 12/1966 | Artuad | 29/96 |
| 3,597,104 | 8/1971 | Salcumbe | 29/96 |
| 3,758,927 | 9/1973 | Stein | 29/96 |
| 3,825,981 | 7/1974 | Cochran | 29/96 |

*Primary Examiner*—Donald G. Kelly
*Attorney, Agent, or Firm*—Bill B. Berryhill

[57] ABSTRACT

A cutting tool which may comprise: an elongated bar member; an anvil member removably fastened to one end of the bar member and having an elongated recess in which a cutting insert may be received for rigid mounting between the anvil and bar members and for radial projection generally perpendicular to the axis of the bar member; and a chip deflector of substantially harder material than the bar member fixed to the bar member for juxtaposed relation with the cutting insert.

12 Claims, 7 Drawing Figures

CUTTING TOOL

BACKGROUND OF THE INVENTION

1. Field of the Invention

The present invention pertains to cutting tools. In particular, it pertains to tools for machining and finishing metal. More specifically, it pertains to tools especially adapted for internal threading and/or grooving of metal.

2. Brief Description of the Prior Art

Cutting tools for machining threads and grooves in metal have been in existence for many years. Tools have been designed for both external and internal machining. For internal threading and grooving, it has been a common practice to fasten the part to be machined in a chuck or vise, to fasten a cutting tool in another chuck or vise of a machine and to rotate one of the chucks relative to the other. In many of such internal cutting tools, the tool includes an elongated bar at the end of which is attached in some fashion a replaceable cutting insert. When the cutting insert is broken or worn, it may be removed and replaced with a new or sharpened cutting insert without having to replace the more expensive bar.

Several of the cutting bars of the prior art are provided with an anvil having a recess or groove in which the cutting insert may be received and by which the cutting insert may be clamped between the anvil and the bar. In the past, some of these anvils have been integrally formed with the bar. However, the anvil is subjected to stress and wear and may after extended use be broken or worn beyond further use. If the anvil is integral with the bar, this would necessitate replacing the entire bar, a relatively expensive proposition.

To eliminate replacement of the bar, various two-piece bar and anvil tools have been developed. Thus, a broken or worn anvil may be replaced without having to replace the bar. However, many such two-piece tools leave much to be desired in rigidity. If a cutting insert is not rigidly maintained between the anvil and bar, chatter may occur resulting in inferior machining and possible breakage of cutting inserts and anvils.

Another problem associated with cutting tools of the type under discussion is the wear caused to the bar from erosion by the chips of metal being removed during machining. After a period of time, this erosion, which generally takes place directly above the cutting insert, may reduce the support area of the bar adjacent the cutting insert until the cutting insert is no longer rigidly and adequately held in place. When this occurs, the complete bar will have to be replaced or repaired by expensive methods.

SUMMARY OF THE INVENTION

In the present invention, a cutting tool of two-piece construction, including a bar member and an anvil member, is provided. The anvil member is removably fastened to one end of the bar member and is provided with an elongated recess in which a cutting insert may be received for rigid mounting between the anvil and bar members for radial projection generally perpendicular to the axis of the bar member. In addition, a chip deflector of substantially harder material than the bar member may be affixed to the bar member for juxtaposed relationship with the cutting insert.

The two-piece bar and anvil construction allows replacement of worn or broken anvils without having to replace the bar member. In addition, it allows right- or left-hand cutting with the same bar member by simply replacing an anvil member of one hand with an anvil member of the opposite hand. A unique tongue and groove construction of the anvil and bar offers quick replacement and superior clamping features.

The chip deflector, which is of a material such as carbide is in the area normally contacted by chips being removed from the machining operation and due to its hardness, extends the life of the bar substantially beyond its life without a chip deflector. Furthermore, if the chip deflector is finally worn or broken, it can be removed and a new chip deflector affixed to the bar.

The anvil and chip deflector construction of the present invention results in a more versatile tool with greater life, cheaper replacement and/or repair as well as superior cutting capabilities.

Several variations of the invention will be described hereafter. Many other variations will be apparent to those skilled in the art from reading the description which follows in conjunction with the accompanying drawings.

DESCRIPTION OF PREFERRED EMBODIMENTS

Figure 1:
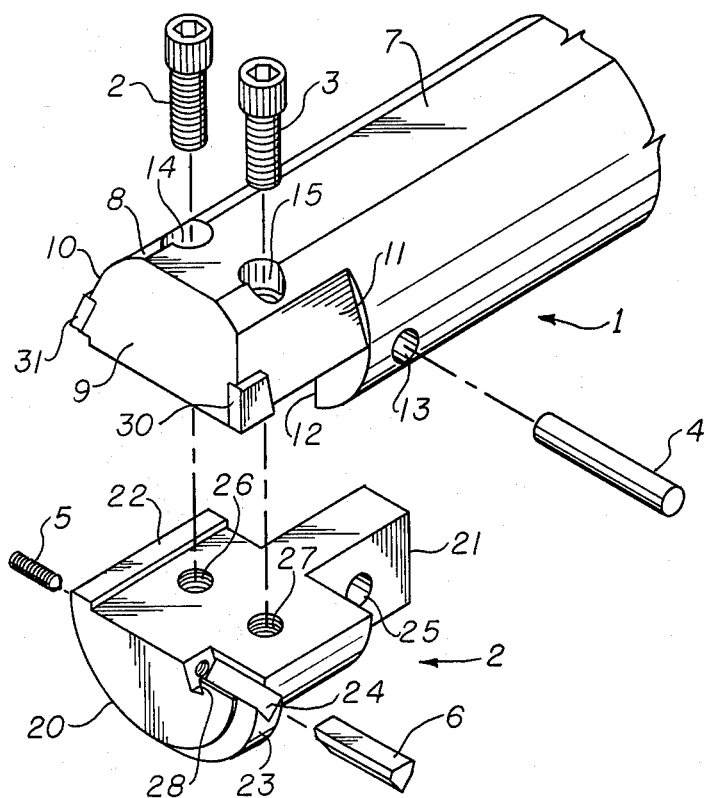
FIG. 1 is an exploded perspective view of a preferred embodiment of the invention.
Figure 2:
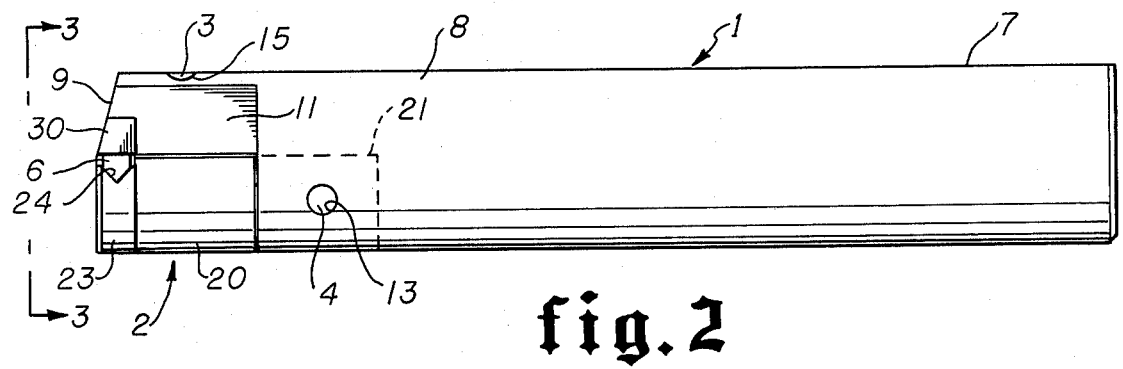
FIG. 2 is a side view of the embodiment of FIG. 1.
Figure 3:
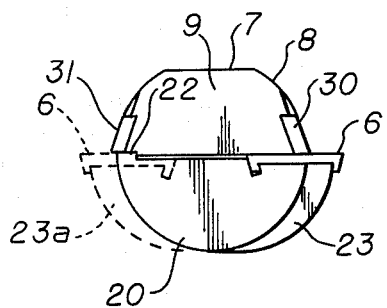
FIG. 3 is an end view of the embodiment of FIGS. 1 and 2, taken along line 3—3 of FIG. 2.

Referring first to FIGS. 1, 2, and 3, there is shown a cutting tool according to a preferred embodiment of the invention having two major assemblies: an elongated bar member 1 and an anvil member 2. The tool also includes cap screws 2 and 3, dowel pin 4, adjusting set screw 5 and may include a cutting insert 6.

As shown, the bar member 1 is generally cylindrical in shape but may be provided with one or more longitudinal flats 7 which may aid in holding the bar member 1 in the chuck or vise or a machine. One end 8 of the bar member 1 may have a portion removed so as to leave a substantially semi-cylindrical end portion 8. The end portion 8 may be champhered at its end and sides to provide a nose area 9 and flats 10 and 11. Adjacent the semi-cylindrical end 8, the bar member 1 may be provided with an elongated groove 12 for receiving the tongue portion of anvil 2, as will be more fully understood hereafter. Tranverse holes 13 are provided through the bar member 11 in the area of tongue groove 12. Countersunk holes 14 and 15 may be provided for receiving cap screws 2 and 3.

In the removed or flat area 11 of the bar member 1 is shown a chip deflector 30. The chip deflector 30 is preferably made of a material substantially harder than the material of bar member 1, such as carbide. To affix the chip deflector 30 to the bar member 1, a relieved or recessed area is first machined and then the deflector placed and brazed therein. It will be noted that when the cutting tool is assembled, the chip deflector 30 will be in juxtaposed relationship with the cutting insert 6. So that the bar member 1 can be used for both righthand and lefthand cutting, an identical chip deflector 31 may be fixed on member 1 on the opposite side in the flat area 10.

The anvil member 2 may include a correlatively shaped semi-cylindrical portion 20 from which extends an elongated tongue portion 21. A portion of the flat surface of the anvil 2 may be machined away to leave a ridge or flat 22.

Projecting radially over approximately eighty to ninety degrees of the cylindrical surface of the semi-cylindrical portion 20 of anvil 2 is a radial rib 23. Provided in the flat face of semi-cylindrical portion 20 and rib 23 is an elongated recess or groove 24 in which may be received the cutting insert 6 so that the cutting insert 6 would project radially and generally perpendicular to the axis of the elongated bar member 1. A preferred configuration for the groove 24 is a V-shaped cross section.

The tongue portion 21 of the anvil 2 is provided with a transverse hole 25 for coaxial alignment with holes 13 in bar member 1. Threaded holes 26 and 27 are provided in semi-cylindrical portion 20 for threaded engagement with cap screws 2 and 3. A tapped and threaded hole 28 is provided through semi-cylindrical portion 20 communicating with one end of groove 24 from the opposite side of the semi-cylindrical portion 20. This hole 28 is for receiving adjusting set screw 5.

On initial assembly, anvil 2 is attached to bar 1 by placing the tongue portion 21 within tongue groove 12 so that holes 13 and 25 are coaxially aligned. Then the dowel pin 4 is inserted in these holes. The tongue 21 and groove 21 are so machined that there is a slight clearance between the downwardly facing bottom of groove 12 and the upper flat surface of the tongue 21. This then permits at least some limited pivoting of the anvil about the axis of pin 4 so as to allow easy insertion of cutting insert 6 within the anvil groove 24. Then, cap screws 2 and 3 are inserted through holes 14 and 15 for engagement with the threaded holes 26 and 27 of the anvil 2. Tightening of the cap screws 2 and 3 draws the anvil flat 22 tightly against the downwardly facing flat surface of semi-cylindrical bar portion 8 and firmly clamps and cutting insert 6 between the anvil 2 and bar 1. Before complete tightening is accomplished, the set screw 5 may be inserted in the tapped and threaded hole 28 and turned for engagement with the non-cutting end of the cutting insert 6. This set screw 5 can then be used to adjust the cutting insert 6 so that its cutting end is at the precise point desired. To remove the cutting insert for replacement or reconditioning, it is a simple matter of loosening the cap screws 2 and 3 to the extent necessary to slip the cutting insert 6 out of groove 24 and slip another therein.

To convert the cutting tool of the present invention from a righthand tool as just described, the anvil 2 may be removed and replaced by one in which the rib 23a, as shown by dotted line in FIG. 3, projects from the opposite side. The cutting insert 6 would then appear as in the dotted lines of FIG. 3 in juxtaposed relationship with chip deflector 31. Thus, the construction offers versatility not present in other cutting tools.

Figure 4:
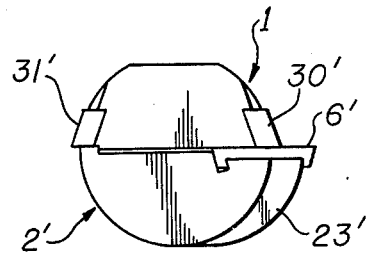
FIG. 4 is an end view of a cutting tool according to an alternate embodiment of the invention.

For extra deep internal grooving and profiling, the cutting tool can be modified as indicated in FIG. 4 so that the rib 23' of anvil 2' projects radially further than the rib 23 of the embodiment of FIGS. 1–3. In addition, the deflector chips 30' and 31' are made to project radially from one end of the bar member 1' so that the cutting insert 6' may be securely clamped between the anvil rib 23' and chip deflector 30'. This allows extra deep threading or profiling without damaging chatter which might occur with other arrangements.

Figure 5:
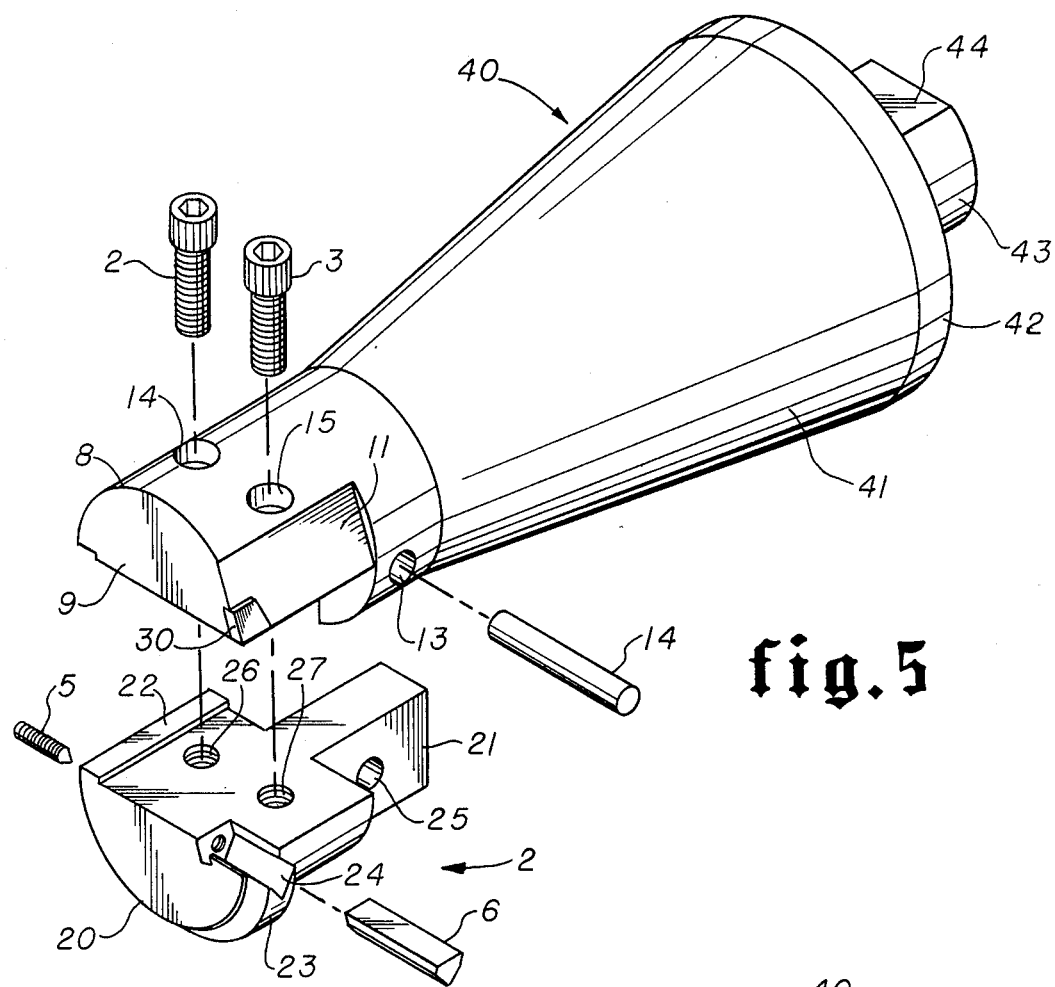
FIG. 5 is an exploded perspective view of a cutting tool according to still another alternate embodiment of the invention.
Figure 6:
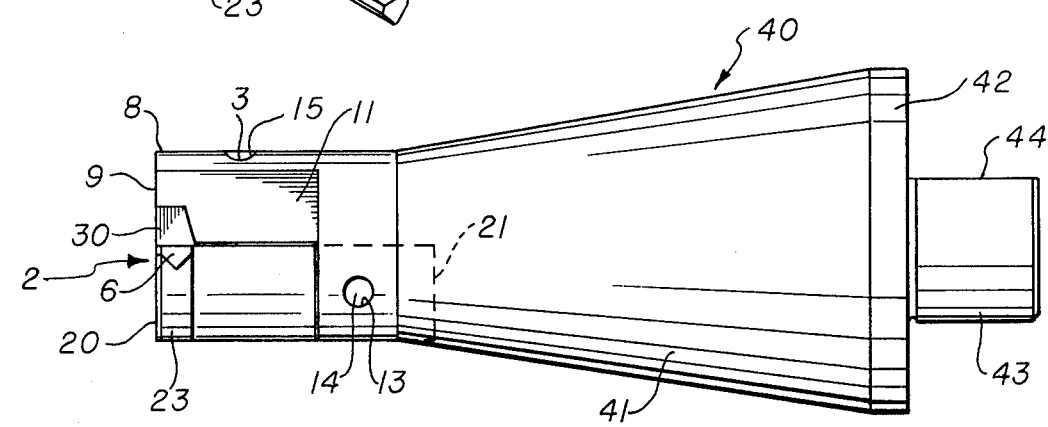
FIG. 6 is a side view of the alternate embodiment of FIG. 5.
Figure 7:
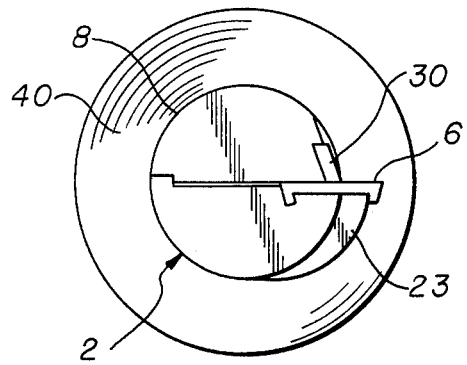
FIG. 7 is an end view of the alternate embodiment of FIGS. 5 and 6, taken along line 7—7 of FIG. 6.

Referring now to FIGS. 5, 6 and 7, an additional embodiment will be described primarily for use in machining internal tapered API threads. In this embodiment, the design of anvil 2 is identical to the anvil of the embodiment of FIGS. 1–3 and no further description thereof is necessary. However, for easy review, the various portions of the anvil of FIGS. 5–7 have been numbered identically to the anvil 2 of FIGS. 1–3 and the same description may apply.

Likewise, the bar member 40 of the embodiment of FIGS. 5–7 is in many ways identical to the bar member 1 of the embodiment of FIGS. 1–3. For example, the semi-cylindrical end 8 is essentially the same and all components associated therewith are shown with the same reference numbers in as in FIGS. 1–3.

The primary difference in the embodiment of FIGS. 5–7 is the provision of an intermediate portion 41 of bar 40 which is frusto-conical, tapering away from the semi-cylindrical end 8 from a first diameter to a larger second diameter at 42. The opposite end 43 is cylindrical and may be provided with flats 44 similar to the flat 7 of the embodiment of FIGS. 1–3 for chucking in a machine. Assembly, replacement of cutting inserts, righthand and lefthand threading, etc. would be accomplished in the same fashion described with reference to the embodiment of FIGS. 1–4.

The primary reason for the embodiment of FIGS. 5–7 is to add mass in the frusto-conical area portion 41 to increase rigidity for machining tapered internal API threads. If the tapered portion 41 were not provided, the entire bar 40 could be of a diameter no larger than the diameter of semi-cylindrical section 8. Such a relatively small diameter would reduce the rigidity of the bar member 40 and likely result in less accurate threading, chattering and breaking of cutting inserts.

As can be seen from the foregoing description, the cutting tool of the present invention provides rigidity, versatility, extended bar life, superior clamping, easy anvil and cutting insert replacement and superior cutting capabilities not present in the prior art. Furthermore, such characteristics and capabilities are provided at less cost than similar cutting tools of the prior art. Coupled with the superior features and costs considerations, the cutting tool of the present invention is unexcelled for its intended applications.

Although several embodiments of the invention have been described herein, many other variations can be made without departing from the spirit of the invention. Therefore, it is intended that the scope of the invention be limited only by the claims which follow.

We claim:

1. A cutting tool comprising:
    an elongated bar member;
    an anvil member removably fastened to one end of said bar member to rigidly clamp a cutting insert between said anvil and bar member for radial projection generally perpendicular to the axis of said elongated bar member;
    a support rib projecting radially from said anvil member;

an elongated recess provided in said anvil member and along said rib in which said cutting insert may be removably received for said radial projection from said bar member; and a chip deflector of substantially harder material than said bar member affixed to said bar member for juxtaposed relationship with said cutting insert on the opposite side from said rib.

2. A cutting tool as set forth in claim 1 in which said one end of said bar is semi-cylindrically shaped, said anvil member comprising a correlative semi-cylindrically shaped portion, the flat sides of said semi-cylindrically shaped bar end and anvil member facing each other so that said bar end and anvil member form a rigid, coherent, substantially cylindrical section from which said cutting insert may radially project.

3. A cutting tool as set forth in claim 2 in which said anvil member comprises an elongated longitudinal tongue portion projecting from said semi-cylindrical portion for engagement with an elongated longitudinal groove in said bar member adjacent said semi-cylindrically shaped one end.

4. A cutting tool as set forth in claim 3 in which said tongue portion and said bar member are provided with coaxial transverse holes through which a pin member may be inserted to hold said tongue-portion within said groove but allowing limited pivoting so that cutting inserts may be placed in or removed from said elongated recess of said anvil member.

5. A cutting tool as set forth in claim 4 including fastening means carried by said bar member and engageable with said anvil member for rigidly fixing said anvil member to said bar member so that a cutting insert placed in said elongated recess may be rigidly clamped between said anvil member and said one end of said bar member.

6. A cutting tool as set forth in claim 1 in which said chip deflector projects radially from said one end of said bar member so that said cutting insert may be securely clamped between said chip deflector and said anvil rib.

7. A cutting tool as set forth in claim 1 in which a second chip deflector of substantially harder material than said bar member is provided on the side of said bar member opposite said first mentioned chip deflector so that said anvil member may be replaced with an anvil member of opposite hand to allow receiving of a cutting insert for radial projection approximately one hundred and eighty degrees, relative to said bar member axis, from said projection of said first mentioned cutting insert.

8. A cutting tool as set forth in claim 2 in which a portion of said bar member adjacent said one end is frusto-conical, tapering away from said one end from a first diameter to a larger second diameter.

9. A cutting tool as set forth in claim 1 in which said bar member is provided with a recessed area in which said chip deflector is rigidly fixed.

10. A cutting tool as set forth in claim 9 in which said chip deflector projects radially outwardly from said bar member so that at least a portion of said cutting insert may be clamped between said chip deflector and said support rib.

11. A cutting tool as set forth in claim 9 in which said chip deflector is of a carbide material and is brazed to said bar member.

12. A cutting tool as set forth in claim 1 in which a portion of said bar member adjacent said one end thereof is frusto-conical, tapering away from said one end from a first diameter to a second larger diameter.

* * * * *